US008263701B2

(12) United States Patent
Kanzaki (10) Patent No.: US 8,263,701 B2
(45) Date of Patent: Sep. 11, 2012

(54) POLYPROPYLENE RESIN COMPOSITION AND MOLDED ARTICLE (75) Inventor: Susumu Kanzaki, Kisarazu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 111 days.

(21) Appl. No.: 12/036,609

(22) Filed: Feb. 25, 2008

(65) Prior Publication Data

US 2008/0221256 A1 Sep. 11, 2008

(30) Foreign Application Priority Data

Feb. 28, 2007 (JP) ................. 2007-048926

(51) Int. Cl.
*C08L 53/00* (2006.01)
*C09J 7/02* (2006.01)
*C08J 3/22* (2006.01)
*C08K 3/34* (2006.01)

(52) U.S. Cl. ...................... 524/505; 524/451
(58) Field of Classification Search .................. 524/451, 524/505

See application file for complete search history.

(56) References Cited

U.S. PATENT DOCUMENTS

| 6,777,497 B2* | 8/2004 | Kanzaki et al. ............... 525/191 |
| 6,906,143 B2 | 6/2005 | Kanzaki |
| 7,439,296 B2 | 10/2008 | Kanzaki |
| 2003/0055172 A1* | 3/2003 | Kanzaki et al. ............... 525/240 |
| 2004/0030052 A1* | 2/2004 | Kanzaki ........................ 525/323 |
| 2005/0154131 A1 | 7/2005 | Kanzaki et al. |
| 2005/0209387 A1* | 9/2005 | Doi et al. ...................... 524/451 |
| 2006/0058434 A1 | 3/2006 | Watanabe |
| 2006/0135672 A1* | 6/2006 | Kanzaki ........................ 524/451 |
| 2006/0160941 A1* | 7/2006 | Kanzaki ........................ 524/451 |
| 2006/0160942 A1* | 7/2006 | Kanzaki ........................ 524/451 |
| 2006/0199909 A1 | 9/2006 | Toyoda et al. |
| 2008/0221256 A1 | 9/2008 | Kanzaki |
| 2008/0319136 A1 | 12/2008 | Oshima et al. |
| 2009/0253849 A1 | 10/2009 | Kanzaki et al. |

FOREIGN PATENT DOCUMENTS

| CN | 1789320 A | | 6/2006 |
| DE | 10 2005 043 643 A1 | | 3/2006 |
| EP | 1 647 575 A1 | | 4/2006 |
| JP | 5-51498 A | | 3/1993 |
| JP | 5-295184 A | | 11/1993 |
| JP | 6-71829 A | | 3/1994 |
| JP | 6-228376 A | | 8/1994 |
| JP | 6-306216 A | | 11/1994 |
| JP | 07157626 A | * | 6/1995 |
| JP | 8-20686 | | 1/1996 |
| JP | 9-48831 A | | 2/1997 |
| JP | 9-67501 A | | 3/1997 |
| JP | 9-71711 | | 3/1997 |
| JP | 9-157492 A | | 6/1997 |
| JP | 2004-292723 | | 10/2004 |
| JP | 2005-213490 | | 8/2005 |
| JP | 2006-111864 | | 4/2006 |
| JP | 2006-193643 | | 7/2006 |
| JP | 2006-193644 | | 7/2006 |
| JP | 2006-316106 | | 11/2006 |
| JP | 2007-92049 A | | 4/2007 |
| JP | 2007-92050 A | | 4/2007 |

OTHER PUBLICATIONS

First Office Action, issued Dec. 9, 2010, in counterpart Chinese Application No. 200810081395.7, along with an English translation.
First Office Action, issued Oct. 18, 2010, in co-pending U.S. Appl. No. 12/303,277.
Second Office Action, issued Mar. 23, 2011, in co-pending U.S. Appl. No. 12/303,277.

* cited by examiner

*Primary Examiner* — Mark Eashoo
*Assistant Examiner* — Angela C Scott
(74) *Attorney, Agent, or Firm* — Sughrue Mion, PLLC (57) ABSTRACT The polypropylene resin composition is disclosed which includes 50-94% by weight of a polypropylene resin having a specific structure, 1-25% by weight of an ethylene-α-olefin copolymer rubber composed of an ethylene-α-olefin ($C_{4-20}$) copolymer rubber having a density of 0.85-0.91 g/cm$^3$ and an MFR of 0.9-20 g/10 min and/or an ethylene-α-olefin ($C_{5-20}$) copolymer rubber having a density of 0.85-0.91 g/cm$^3$ and MFR of not less than 0.01 but less than 0.9 g/10 min, and 5-25% by weight of an inorganic filler.

7 Claims, 1 Drawing Sheet

POLYPROPYLENE RESIN COMPOSITION AND MOLDED ARTICLE

BACKGROUND OF THE INVENTION

1. Field of the Invention

The present invention relates to polypropylene resin compositions and molded articles made therefrom.

2. Description of the Related Art

Polypropylene resin compositions are materials excellent in rigidity, impact resistance, and the like, and they are used in a wide variety of applications in the form of molded articles such as automotive interior or exterior components and housings of electric appliances.

For example, JP-A5-51498 discloses a thermoplastic resin composition comprising from 50 to 750 by weight of a crystalline polypropylene, from 15 to 35% by weight of an ethylene-butene-1 copolymer rubber having a butene-1 content, an intrinsic viscosity and a Mooney viscosity each within specific ranges, and from 5 to 20% by weight of talc having an average particle diameter within a specific range.

JP-A 7-157626 discloses a thermoplastic resin composition comprising a propylene-ethylene block copolymer prepared by multistage polymerization and a polyolefin rubber. This document teaches to use, as the propylene-ethylene block copolymer, a block copolymer composed of a block copolymer including a propylene-ethylene random copolymer phase having an ethylene content of from 5 to 50% by weight and an intrinsic viscosity of from 4.0 to 8.0 dl/g and a block copolymer including a propylene-ethylene block copolymer phase having an ethylene content of more than 50% by weight but not more than 98% by weight and an intrinsic viscosity of not less than 2.0 dl/g but less than 4.0 dl/g.

JP-A 9-157492 discloses a thermoplastic resin composition comprising a propylene-ethylene block copolymer prepared by multistage polymerization, an ethylene-butene copolymer rubber and talc. This document teaches to use, as the propylene-ethylene block copolymer, a block copolymer composed of a homopolypropylene portion whose melt flow rate is within a specific range and whose heat of fusion determined by DSC and melt flow rate satisfy a specific relationship, a propylene-ethylene copolymer portion having a lower ethylene content and a propylene-ethylene copolymer portion having a higher ethylene content.

However, polypropylene resin compositions and molded articles produced therefrom have been requested to be improved in flow mark appearance, toughness, low temperature impact strength, especially high-speed impact strength, and balance between rigidity and surface hardness.

SUMMARY OF THE INVENTION

Under such a circumstance, an objective of the present invention is to provide a polypropylene resin composition from which molded articles can be produced, the molded articles having improved flow mark appearance, being excellent in toughness and low temperature impact strength, and having well-balanced rigidity and surface hardness. Another objective of the invention is to provide molded articles produced from such a polypropylene resin composition.

In one aspect, the present invention provides a polypropylene resin composition comprising:

from 50 to 94% by weight of a polypropylene resin (A), from 1 to 25% by weight of an ethylene-α-olefin copolymer rubber (B) comprising an ethylene-α-olefin copolymer rubber (B-1) comprising a C4 to C12 α-olefin and ethylene and having a density of from 0.85 to 0.91 g/cm$^3$ and a melt flow rate of from 0.9 to 20 g/10 min as measured at a temperature of 190° C. and a load of 2.16 kgf and/or an ethylene-α-olefin copolymer rubber (B-2) comprising a C5 to C12 α-olefin and ethylene and having a density of from 0.85 to 0.91 g/cm$^3$ and a melt flow rate of not less than 0.01 but less than 0.9 g/10 min as measured at a temperature of 190° C. and a load of 2.16 kgf, and from 5 to 25% by weight of an inorganic filler (C), where the amounts of (A), (B) and (C) are each based on the total weight of the polypropylene-based resin composition, wherein the polypropylene resin (A) is a crystalline propylene-ethylene block copolymer (A-1) satisfying the following requirements (1), (2), (3) and (4), or a polymer mixture (A-3) comprising the block copolymer (A-1) and a crystalline propylene homopolymer (A-2), requirement (1): the block copolymer (A-1) is a crystalline propylene-ethylene block copolymer comprising from 55 to 85% by weight, based on the total weight of the block copolymer (A-1), of a crystalline polypropylene portion and from 15 to 45% by weight, based on the total weight of the block copolymer (A-1), of a propylene-ethylene random copolymer portion, requirement (2): the crystalline polypropylene portion in the block copolymer (A-1) is a propylene homopolymer or a copolymer of propylene with 1 mol % or less, based on the total amount of all monomers in the copolymer, of ethylene or an α-olefin having 4 or more carbon atoms, requirement (3): the weight ratio of propylene to ethylene contained in the propylene-ethylene random copolymer portion of the block copolymer (A-1) is from 75/25 to 40/60, requirement (4) the propylene-ethylene random copolymer portion of the block copolymer (A-1) comprises a propylene-ethylene random copolymer component (EP-A) and a propylene-ethylene random copolymer component (EP-B), the copolymer component (EP-A) having an intrinsic viscosity $[\eta]_{EP-A}$ of from 5.5 dl/g to 9 dl/g and an ethylene content $[(C2')_{EP-A}]$ of not less than 20% by weight but less than 50% by weight, and the copolymer component (EP-B) having an intrinsic viscosity $[\eta]_{EP-B}$ of from 0.5 dl/g to 4 dl/g and an ethylene content $[(C2')_{EP-B}]$ of from 30% by weight to 60% by weight.

In another aspect, the present invention provides a molded article produced from the polypropylene resin composition.

By injection molding the polypropylene resin composition of the present invention, it is possible to produce a molded article in which flow marks are not very noticeable and which excels in toughness and low temperature impact strength and is well-balanced in rigidity and surface hardness.

DESCRIPTION OF THE PREFERRED EMBODIMENTS

The polypropylene resin composition of the present invention is a polypropylene resin composition comprising from 50 to 94% by weight of a polypropylene resin (A), from 1 to 25% by weight of an ethylene-α-olefin copolymer rubber (B) comprising an ethylene-α-olefin copolymer rubber (B-1) and/or (B-2), and from 5 to 25% by weight of an inorganic filler (C), wherein the amounts of (A), (B) and (C) are each based on the total weight of the polypropylene-based resin composition.

[Polypropylene Resin (A)]

The polypropylene resin (A) is a crystalline propylene-ethylene block copolymer (A-1), or a polymer mixture (A-3) comprising the block copolymer (A-1) and a crystalline propylene homopolymer (A-2).

<Crystalline Propylene-ethylene Block Copolymer (A-1)>

The crystalline propylene-ethylene block copolymer (A-1) is a crystalline propylene-ethylene block copolymer comprising from 55 to 85% by weight, based upon the total weight of the block copolymer, of a crystalline polypropylene portion and from 15 to 45% by weight, based upon the total weight of the block copolymer, of a propylene-ethylene random copolymer portion.

In view of the melt fluidity of the composition, and the rigidity, hardness, toughness and impact resistance of molded articles produced from the composition, it is preferable that the crystalline propylene-ethylene block copolymer (A-1) comprises from 55 to 80% by weight of a crystalline polypropylene portion and from 20 to 45% by weight of a propylene-ethylene random copolymer portion, and preferably comprises from 60 to 75% by weight of a crystalline polypropylene portion and from 25 to 40% by weight of a propylene-ethylene random copolymer portion.

In view of the rigidity, heat resistance and hardness of molded articles, the crystalline polypropylene portion of the block copolymer (A-1) is a propylene homopolymer or a copolymer of propylene with 1 mol % or less, based on the total amount of all monomers in the copolymer, of ethylene or α-olefin having 4 or more carbon atoms.

In view of the rigidity, heat resistance or hardness of molded articles, it is preferable that the crystalline polypropylene portion of the block copolymer (A-1) be a propylene homopolymer having an isotactic pentad fraction measured by $^{13}$C-NMR of 0.97 or more, and preferably be a propylene homopolymer having an isotactic pentad fraction of 0.98 or more.

The isotactic pentad fraction is a fraction of propylene monomer units which are present at the center of an isotactic chain in the form of a pentad unit, in other words, the center of a chain in which five propylene monomer units are meso-bonded successively, in the polypropylene molecular chain as measured by use of $^{13}$C-NMR. The measuring method using $^{13}$C-NMR is disclosed by A. Zambelli et al. in Macromolecules, 6, 925 (1973).

The assignment of NMR absorption peaks is carried out according to the disclosure of Macromolecules, 8, 687 (1975). Specifically, the isotactic pentad fraction is determined as an area fraction of mmmm peaks in the whole peak area of methyl carbon ranges of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

In view of the balance between the melt fluidity of the composition and the toughness of molded articles, it is preferable that the crystalline polypropylene portion of the block copolymer (A-1) has an intrinsic viscosity $[\eta]_P$ of from 0.6 to 1.5 dl/g, and preferably from 0.7 to 1.2 dl/g.

In view of the melt fluidity of the composition, and the rigidity and toughness of molded articles produced from the composition, it is preferable that the molecular weight distribution (Mw/Mn) of the crystalline polypropylene portion as measured by gel permeation chromatography (GPC) be not less than 3 but less than 7, and preferably not less than 3 but less than 5.

In view of the impact resistance of molded articles produced from the composition, the weight ratio of propylene to ethylene contained in the propylene-ethylene random copolymer portion of the block copolymer (A-1) is from 75/25 to 40/60, and preferably from 70/30 to 40/60.

The propylene-ethylene random copolymer portion of the block copolymer (A-1) comprises a propylene-ethylene random copolymer component (EP-A) and a propylene-ethylene random copolymer component (EP-B), the copolymer component (EP-A) having an intrinsic viscosity $[\eta]_{EP-A}$ of from 5.5 dl/g to 9 dl/g and an ethylene content $[(C2')_{EP-A}]$ of not less than 20% by weight but less than 50% by weight, and the copolymer component (EP-B) having an intrinsic viscosity $[\eta]_{EP-B}$ of from 0.5 dl/g to 4 dl/g and an ethylene content $[(C2')_{EP-B}]$ of from 30% by weight to 60% by weight.

In view of the toughness and impact resistance of molded article to be obtained and for inhibiting generation of flow marks in the production of molded article, the ethylene content $[(C2')_{EP-A}]$ is not less than 20% by weight but less than 50% by weight, and preferably from 25 to 45% by weight, and more preferably from 25 to 35% by weight.

In view of the melt fluidity of the composition and the rigidity, hardness, toughness and impact resistance of molded articles, and for inhibiting generation of flow marks and hard spots in molded products, the copolymer component (EP-A) has an intrinsic viscosity $[\eta]_{EP-A}$ of from 5.5 dl/g to 9 dl/g, and preferably more than 6 dl/g but not more than 8 dl/g.

In view of the impact resistance of molded articles at low temperatures, in the propylene-ethylene random copolymer portion of the block copolymer (A-1), it is preferable that the ethylene content $[(C2')_{EP-B}]$ of the copolymer component (EP-B) be not less than the ethylene content $[(C2')_{EP-A}]$ of the copolymer component (EP-A), preferably from 30 to 60% by weight, and more preferably from 35 to 55% by weight.

In view of the melt fluidity of the composition, and the rigidity, hardness, toughness and impact resistance of molded articles produced from the composition, the copolymer component (EP-B) has an intrinsic viscosity $[\eta]_{EP-B}$ of from 0.5 dl/g to 4 dl/g, and preferably not less than 1.5 dl/g but less than 3.5 dl/g.

In view of the moldability of the composition and the impact resistance of molded articles, it is preferable that the crystalline propylene-ethylene block copolymer has a melt flow rate (henceforth, MFR) of from 5 to 120 g/10 min, and preferably from 10 to 100 g/10 min as measured at a temperature of 230° C. and a load of 2.16 kgf in accordance with JIS K-7120.

The crystalline propylene-ethylene block copolymer (A-1) can be produced by a conventional polymerization method using, for example, a catalyst system composed of (a) a solid catalyst component including magnesium, titanium, halogen and an electron donor as essential components, (b) an organoaluminum compound and (c) an electron donating component. This type of catalyst system can be produced by, for example, the methods described in detail in JP-A 1-319508, JP-A 7-216017, JP-A 10-212319, JP-A 2004-182876, etc.

Examples of the method for producing the crystalline propylene-ethylene block copolymer (A-1) include:

(1) a method including at least three polymerization steps, in which method a crystalline polypropylene portion is produced in the first step, a propylene-ethylene random copolymer component (EP-A) having an ethylene content $[(C2')_{EP-A}]$ of from 20% by weight to 50% by weight and an intrinsic viscosity $[\eta]_{EP-A}$ of from 5.5 dl/g to 9 dl/g is then produced in the second step, and subsequently a propylene-ethylene random copolymer component (EP-B) having an ethylene content $[(C2')_{EP-B}]$ of from 30% by weight to 60% by weight and an intrinsic viscosity $[\eta]_{EP-B}$ of from 0.5 dl/g to 4 dl/g is produced in the third step, and (2) a method in which a crystalline polypropylene portion is produced in the first step, a propylene-ethylene random copolymer component (EP-B) having an ethylene content [$(C2')_{EP-B}$] of from 30% by weight to 60% by weight and an intrinsic viscosity [$\eta]_{EP-B}$ of from 0.5 dl/g to 4 dl/g is then produced in the second step, and subsequently a propylene-ethylene random copolymer component (EP-A) having an ethylene content [$(C2')_{EP-A}$] of from 20% by weight to 50% by weight and an intrinsic viscosity [$\eta]_{EP-A}$ of from 5.5 dl/g to 9 dl/g is produced in the third step.

Examples of the polymerization method include bulk polymerization, solution polymerization, slurry polymerization, vapor phase polymerization, and the like. Such polymerization methods may be in a batch system or in a continuous system and may be performed in appropriate combination. From the viewpoint of industrial practice, vapor phase polymerization in a continuous system and a combination of bulk polymerization and vapor phase polymerization in a continuous system are preferred.

More specific examples of the polymerization method include:

(3) a continuous production method using an apparatus including three polymerization reactors arranged in series, wherein in the presence of a catalyst system prepared by bringing the aforementioned solid catalyst component (a), organoaluminum compound (b) and electron donating component (c) into contact with each other, a crystalline polypropylene portion is produced in the first reactor, the product is then transferred to the second reactor and a propylene-ethylene random copolymer component (EP-A) having an ethylene content [$(C2')_{EP-A}$] of from 20% by weight to 50% by weight and an intrinsic viscosity [$\eta]_{EP-A}$ of from 5.5 dl/g to 9 dl/g is produced in the second reactor, the product is then transferred to the third reactor, a propylene-ethylene random copolymer component (EP-B) having an ethylene content [$(C2')_{EP-B}$] of from 30% by weight to 60% by weight and an intrinsic viscosity [$\eta]_{EP-B}$ of from 0.5 dl/g to 4 dl/g is produced in the third reactor, and (4) a continuous production method using an apparatus including three polymerization reactors arranged in series, wherein in the presence of a catalyst system prepared by bringing the aforementioned solid catalyst component (a), organoaluminum compound (b) and electron donating component (c) into contact with each other, a crystalline polypropylene portion is produced in the first reactor, the product is then transferred to the second reactor and a propylene-ethylene random copolymer component (EP-B) having an ethylene content [$(C2')_{EP-B}$] of from 30% by weight to 60% by weight and an intrinsic viscosity [$\eta]_{EP-B}$ of from 0.5 dl/g to 4 dl/g is produced in the second reactor, the product is then transferred to the third reactor, a propylene-ethylene random copolymer component (EP-A) having an ethylene content [$(C2')_{EP-A}$] of from 20% by weight to 50% by weight and an intrinsic viscosity [$\eta]_{EP-A}$ of from 5.5 dl/g to 9 dl/g is produced in the third reactor.

The amount of the solid catalyst component (a), the organoaluminum compound (b) and the electron donating component (c) used in the aforementioned polymerization methods and the method for feeding each of the catalyst components into polymerization reactors may be determined appropriately depending on the type of the catalyst.

The polymerization temperature is typically from −30 to 300° C., and preferably from 20 to 180° C. The polymerization pressure is typically from normal pressure to 10 MPa, and preferably from 0.2 to 5 MPa. As a molecular weight regulator, hydrogen may be used.

In the production of the crystalline propylene-ethylene block copolymer (A-1), preliminary polymerization may be conducted prior to the main polymerization. The preliminary polymerization can be carried out, for example, by feeding a small amount of propylene in the presence of a solid catalyst component (a) and an organoaluminum compound (b), in a solvent, in a slurry state.

To the crystalline propylene-ethylene block copolymer (A-1), various types of additives may be added. Examples of such additives include antioxidants, UV absorbers, lubricants, pigments, antistatic agents, copper inhibitors, flame retarders, neutralizing agents, foaming agents, plasticizers, nucleating agents, foam inhibitors, crosslinking agents, etc. Among such additives, antioxidants and UV absorbers are preferably added for improving the heat resistance, weather resistance, and oxidation resistance.

<Crystalline Propylene Homopolymer (A-2)>

It is preferable that the crystalline propylene homopolymer (A-2) be preferably a homopolymer having an isotactic pentad fraction of 0.97 or more, and preferably be a homopolymer having an isotactic pentad fraction of 0.98 or more.

It is preferable that the crystalline propylene homopolymer (A-2) has an MFR of from 20 to 500 g/10 min, and preferably from 80 to 300 g/10 min as measured at a temperature of 230° C. and a load of 2.16 kgf in accordance with JIS K-7120.

The crystalline propylene homopolymer (A-2) can be produced using the same type of catalyst as that used in the production of the crystalline propylene-ethylene block copolymer (A-1).

<Polymer Mixture (A-3)>

The polypropylene resin (A) contained in the polypropylene resin composition of the present invention may be either a crystalline propylene-ethylene block copolymer (A-1) alone or a polymer mixture (A-3) comprising the crystalline propylene-ethylene block copolymer (A-1) and a crystalline propylene homopolymer (A-2).

It is preferable that the content of the crystalline propylene-ethylene block copolymer (A-1) contained in the polymer mixture (A-3) be from 30 to 99% by weight, and that the content of the crystalline propylene homopolymer (A-2) be from 1 to 70% by weight. It is more preferable that the content of the propylene-ethylene block copolymer (A-1) be from 50 to 90% by weight and that the content of the crystalline propylene homopolymer (A-2) be from 10 to 50% by weight.

In view of the melt fluidity of the composition and the rigidity and impact resistance of molded articles, the content of the polypropylene resin (A) contained in the polypropylene resin composition of the present invention is from 50 to 94% by weight, preferably from 55 to 90% by weight, and more preferably from 60 to 85% by weight, based on the total weight of the polypropylene resin composition.

[Ethylene-α-olefin Copolymer Rubber (B)]

The ethylene-α-olefin copolymer rubber (B) used in the present invention is an ethylene-α-olefin copolymer rubber comprising an ethylene-α-olefin copolymer rubber (B-1) comprising a C4 to C12 α-olefin and ethylene and having a density of from 0.85 to 0.91 g/cm³ and a melt flow rate of from 0.9 to 20 g/10 min as measured at a temperature of 190° C. and a load of 2.16 kgf in accordance with JIS K-7210 and/or an ethylene-α-olefin copolymer rubber (B-2) comprising a C5 to C12 α-olefin and ethylene and having a density of from 0.85 to 0.91 g/cm³ and a melt flow rate of not less than 0.01 but less than 0.9 g/10 min as measured at a temperature of 190° C. and a load of 2.16 kgf in accordance with JIS K-7210.

Examples of the C4 to C12 α-olefin include butene-1, pentene-1, hexene-1, heptene-1, octene-1, and decene-1. Butene-1, hexene-1 and octene-1 are preferred.

From the viewpoint of the impact strength, especially impact strength at low temperatures, of molded articles, the content of the α-olefin contained in the copolymer rubber (B) is usually from 20 to 50 by weight, and preferably from 24 to 50% by weight, based on the total weight of the copolymer rubber (B).

Examples of the ethylene-α-olefin copolymer rubber include ethylene-butene-1 random copolymer rubber, ethylene-hexene-1 random copolymer rubber, ethylene-octene-1 random copolymer rubber, and the like. Ethylene-octene-1 random copolymer rubber and ethylene-butene-1 random copolymer rubber are preferred. Two or more kinds of ethylene-α-olefin random copolymer rubbers may be used in combination.

In view of the impact resistance, especially impact strength at low temperatures, of molded articles, the densities of the ethylene-α-olefin copolymer rubber (B-1) and the ethylene-α-olefin copolymer rubber (B-2) are independently within the range of from 0.85 to 0.91 $g/cm^3$, and preferably within the range of from 0.85 to 0.87 $g/cm^3$.

The melt flow rate of the ethylene-α-olefin copolymer rubber (B-1) as measured at a temperature of 190° C. and a load of 2.16 kgf in accordance with JIS K-7210 is from 0.9 to 20 g/10 min. In view of the impact resistance, especially impact strength at low temperatures, of molded articles, it is preferably from 0.9 to 15 g/10 min, and more preferably from 0.9 to 7 g/10 min. The melt flow rate of the ethylene-α-olefin copolymer rubber (B-2) as measured at a temperature of 190° C. and a load of 2.16 kgf in accordance with JIS K-7210 is not less than 0.01 but less than 0.9 g/10 min. In view of the impact resistance, especially impact strength at low temperatures, of molded articles, it is preferably not less than 0.05 but less than 0.9 g/10 min, more preferably, not less than 0.2 but less than 0.9 g/10 min.

The ethylene-α-olefin copolymer rubber (B) can be produced by copolymerizing ethylene and various α-olefins using a conventional catalyst and a conventional polymerization method.

Examples of the conventional catalyst include catalyst systems comprising vanadium compounds and organoaluminum compounds, Ziegler-Natta catalyst systems, metallocene catalyst systems and the like. Examples of the conventional polymerization method include solution polymerization, slurry polymerization, high-pressure ion polymerization vapor phase polymerization, and the like.

In view of the rigidity and impact strength of molded articles produced from the composition, the content of the ethylene-α-olefin copolymer rubber (B) contained in the polypropylene resin composition of the present invention is from 1 to 25% by weight, preferably from 3 to 22% by weight, and more preferably from 5 to 20% by weight, based on the total weight of the polypropylene resin composition.

[Inorganic Filler (C)]

The inorganic filler (C) used in the present invention contributes to the rigidity of molded articles, and examples thereof include calcium carbonate, barium sulfate, mica, crystalline calcium silicate, talc, magnesium sulfate fiber, and the like. Talc and magnesium sulfate fiber are preferred. Such inorganic fillers may be used in combination.

The talc used as the inorganic filler (C) is hydrous magnesium silicate which has been ground. The crystal structure of hydrous magnesium silicate is pyrophyllite-type three-layer structure. Talc is a compound composed of lamination of this structure. More preferable talc is one in a tabular form prepared by finely grinding hydrous magnesium silicate crystals to a size almost as small as unit layers.

It is preferable that the average particle diameter of the talc be not more than 3 μm. The average particle diameter of talc means a 50% equivalent particle diameter $D_{50}$ which is determined from an integral distribution curve by the sub-sieve method which is measured by suspending talc in a dispersing medium, such as water or alcohol, by use of a centrifugal sedimentation type particle size distribution analyzer.

The inorganic filler may be used without being subjected to any preliminary treatment. Alternatively, it may be used after treatment of its surface with various silane coupling agents, titanium coupling agents, higher fatty acids, higher fatty esters, higher fatty amides, salts of higher fatty acids, or other surfactants in order to improve the interfacial adhesion with the polypropylene resin (A) or improve the dispersibility in the polypropylene resin (A).

In the case of using magnesium sulfate fiber as the inorganic filler (C), it is preferable that the average fiber length be from 5 to 50 μm, and preferably from 10 to 30 μm. It is preferable that the average diameter of the magnesium sulfate fiber be from 0.3 to 2 μm, and preferably from 0.5 to 1 μm.

In view of the rigidity and impact strength of molded articles produced from the composition, the content of the inorganic filler (C) contained in the polypropylene resin composition of the present invention is from 5 to 25% by weight, preferably from 7 to 23% by weight, and more preferably from 10 to 20% by weight, based on the total weight of the polypropylene resin composition.

The polypropylene resin composition of the present invention can be produced by melt-kneading the components. In the melt-kneading, kneading devices such as single screw extruders, twin screw extruders, Banbury mixers and hot rolls can be used. The temperature of the resin at the time of kneading is typically from 170 to 250° C., and the kneading time is typically from 1 to 20 minutes. The kneading may be performed either by adding all the components simultaneously or by adding the components sequentially.

Examples of the method for kneading the components include methods (1) to (4) shown below.

(1) A method in which a crystalline propylene-ethylene block copolymer (A-1), an ethylene-α-olefin copolymer rubber (B) and an inorganic filler (C) are mixed simultaneously and then kneaded.

(2) A method in which a crystalline propylene-ethylene block copolymer (A-1) and a crystalline propylene homopolymer (A-2), an ethylene-α-olefin copolymer rubber (B) and an inorganic filler (A) are mixed simultaneously and then kneaded.

(3) A method in which a crystalline propylene-ethylene block copolymer (A-1) and an ethylene-α-olefin copolymer rubber (B) are kneaded, and then an inorganic filler (C) is added and further kneaded.

(4) A method in which a crystalline propylene-ethylene block copolymer (A-1) and an inorganic filler (C) are kneaded, and then an ethylene-α-olefin copolymer rubber (B) is added and further kneaded.

When a polymer mixture (A-3) containing a crystalline propylene-ethylene block copolymer (A-1) and a crystalline propylene homopolymer (A-2) is used as the polypropylene resin (A), a crystalline propylene homopolymer (A-2) may be added in the method (3) or (4).

To the polypropylene resin composition of the present invention, various additives may be added. Examples of such additives include antioxidants, UV absorbers, lubricants, pigments, antistatic agents, copper inhibitors, flame retarders, neutralizing agents, foaming agents, plasticizers, nucleating agents, foam inhibitors, crosslinking agents, etc. In order to improve heat resistance, weather resistance or oxidation resistance, addition of an antioxidant or UV absorber is preferred.

In order to further improve the balance among mechanical properties, a vinyl aromatic compound-containing rubber may be added to the polypropylene resin composition of the present invention.

Examples of the vinyl aromatic compound-containing rubber include block copolymers composed of a vinyl aromatic compound polymer block, a conjugated diene-based polymer block, and the like. It is preferable that the hydrogenation ratio of the double bonds of the conjugated diene moieties be not less than 80% by weight, and preferably not less than 85% by weight, based on the total weight of the double bonds contained in the conjugated diene moieties.

It is preferable that the molecular weight distribution of the vinyl aromatic compound-containing rubber as measured by gel permeation chromatography (GPC) be not more than 2.5, and preferably from 1.0 to 2.3.

It is preferable that the content of the vinyl aromatic compound contained in the vinyl aromatic compound-containing rubber be from 10 to 20% by weight, and preferably from 12 to 19% by weight, based on the total weight of the vinyl aromatic compound-containing rubber.

It is preferable that the vinyl aromatic compound-containing rubber has an MFR of from 0.01 to 15 g/10 min, and preferably from 0.03 to 13 g/10 min as measured at a temperature of 230° C. and a load of 2.16 kgf in accordance with JIS K-7210.

Examples of the vinyl aromatic compound-containing rubber include block copolymers such as styrene-ethylene-butene-styrene rubbers (SEBS), styrene-ethylene-propylene-styrene rubbers (SEPS), styrene-butadiene rubbers (SBR), styrene-butadiene-styrene rubbers (SBS) and styrene-isoprene-styrene rubbers (SIS), and hydrogenated block copolymers produced by hydrogenation of the block copolymers listed above. Moreover, rubbers produced by causing a vinyl aromatic compound such as styrene to react with an ethylene-propylene-nonconjugated diene rubber are also applicable. Two or more kinds of vinyl aromatic compound-containing rubbers may be used in combination.

The vinyl aromatic compound-containing rubber can be produced, for example, by linking a vinyl aromatic compound to an olefin-based copolymer rubber or conjugated diene rubber.

The injection molding article of the present invention is a molded article produced by injection molding the polypropylene resin composition of the present invention. Particularly preferable applications of the injection molded article of the present invention are automobile parts, such as door trims, pillars, instrument panels, bumpers and the like.

EXAMPLES

The present invention is described below with reference to Examples and Comparative Examples. The methods for measuring physical properties of the polymer materials used and the molded articles produced in Examples and Comparative Examples are described below.

(1) Intrinsic Viscosity (Unit: dl/g)

Reduced viscosities were measured at three concentrations of 0.1, 0.2 and 0.5 g/dl using a Ubbelohde's viscometer. An intrinsic viscosity was calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated in zero. The measurement was carried out at a temperature of 135° C. using Tetralin as solvent.

(1-1) Intrinsic Viscosity of Crystalline Propylene-Ethylene Block Copolymer (1-1a) Intrinsic Viscosity of Crystalline Polypropylene Portion: $[\eta]_P$ In the course of the production of a crystalline propylene-ethylene copolymer, after the first step for producing the crystalline polypropylene portion, a polymer powder was taken out from the reactor. Using the polymer powder, reduced viscosities were measured by method (1) described above, and an intrinsic viscosity was determined from the reduced viscosities. The intrinsic viscosity was defined to be the intrinsic viscosity $[\eta]_P$ of the crystalline polypropylene portion contained in the crystalline propylene-ethylene block copolymer.

(1-1b) Intrinsic Viscosity of Propylene-Ethylene Random Copolymer: $[\eta]_{EP}$ The intrinsic viscosity $[\eta]_P$ of the crystalline polypropylene portion and the intrinsic viscosity $[\eta]_T$ of the crystalline propylene-ethylene block copolymer were measured by the method (1) described above. The intrinsic viscosity $[\eta]_{EP}$ of the propylene-ethylene random copolymer portion contained in the crystalline propylene-ethylene block copolymer was calculated from the following equation using the weight ratio X of the propylene-ethylene random copolymer portion to the propylene-ethylene block copolymer. The weight ratio X was determined by the measuring method (2) given below.

$$[\eta]_{EP}=[\eta]_T/X-(1/X-1)[\eta]_P$$

$[\eta]_P$: Intrinsic viscosity (dl/g) of the crystalline polypropylene portion $[\eta]_T$: Intrinsic viscosity (dl/g) of the propylene-ethylene block copolymer In the case where a propylene-ethylene random copolymer portion was produced by two-stage polymerization, the intrinsic viscosity $[\eta]_{EP-1}$ of the propylene-ethylene random copolymer component (EP-1) produced in the first stage, the intrinsic viscosity $[\eta]_{EP-2}$ of the propylene-ethylene random copolymer component (EP-2) produced in the second stage, and the intrinsic viscosity $[\eta]_{EP}$ of the propylene-ethylene random copolymer portion in the finally obtained propylene-ethylene block copolymer including EP-1 and EP-2 were determined in the following methods (b-1), (b-2) and (b-3), respectively.

(b-1) Intrinsic Viscosity $[\eta]_{EP-1}$

After producing the propylene-ethylene random copolymer component (EP-1), the intrinsic viscosity ($[\eta]_{(1)}$) of a sample taken out from the polymerization reactor was measured and then the intrinsic viscosity $[\eta]_{EP-1}$ of the propylene-ethylene random copolymer component (EP-1) was determined in the same way as the (1-1b) described above.

$$[\eta]_{EP-1}=[\eta]_{(1)}/X_{(1)}-(1/X_{(1)}-1)[\eta]_P$$

$[\eta]_P$: Intrinsic viscosity (dl/g) of the crystalline polypropylene portion $[\eta](1)$: Intrinsic viscosity (dl/g) of the propylene-ethylene block copolymer after the polymerization for the production of EP-1

$X_{(1)}$: Weight ratio of EP-1 to the propylene-ethylene block copolymer after the polymerization for the production of EP-1

(b-2) Intrinsic Viscosity $[\eta]_{EP}$

The intrinsic viscosity $[\eta]_{EP}$ of the propylene-ethylene random copolymer included in the finally obtained propylene-ethylene block copolymer including EP-1 and EP-2 is determined in the same way as the (1-1b) described above.

$$[\eta]_{EP}=[\eta]_T/X-(1/X-1)[\eta]_P$$

$[\eta]_P$: Intrinsic viscosity (dl/g) of the crystalline polypropylene portion
$[\eta]_T$: Intrinsic viscosity (dl/g) of the propylene-ethylene block copolymer finally obtained
X: Weight ratio of the propylene-ethylene random copolymer portion finally obtained to the propylene-ethylene block copolymer finally obtained.
(b-3) Intrinsic Viscosity $[\eta]_{EP-2}$ The intrinsic viscosity $[\eta]_{EP-2}$ of the propylene-ethylene random copolymer component (EP-2) was determined from the intrinsic viscosity $[\eta]_{EP}$ of the propylene-ethylene random copolymer portion in the propylene-ethylene block copolymer finally obtained, the intrinsic viscosity $[\eta]_{EP-1}$ of a propylene-ethylene random copolymer component (EP-1), and their weight ratios.

$$[\eta]_{EP-2}=([\eta]_{EP}\times X-[\eta]_{EP-1}\times X_1)/X_2$$

$X_1$: Weight ratio to EP-1 to the propylene-ethylene block copolymer finally obtained $$X_1=(X_{(1)}-X\times X_{(1)})/(1-X_{(1)})$$

$X_2$: Weight ratio to EP-2 to the propylene-ethylene block copolymer finally obtained $$X_2=X-X_1$$

(2) Weight Ratio of Propylene-ethylene Random Copolymer Portion to Propylene-ethylene Block Copolymer: X In a propylene-ethylene block copolymer, the heat of crystal fusion was measured for each of the crystalline polypropylene portion and the block copolymer. Based on the measurements, the weight ratio X of the propylene-ethylene random copolymer portion to the block copolymer was calculated from the following equation.

$$X=1-(\Delta Hf)T/(\Delta Hf)P$$

$(\Delta Hf)T$: Heat of fusion of the block copolymer (cal/g)
$(\Delta Hf)P$: Heat of fusion of the crystalline polypropylene portion (cal/g)
(3) Ethylene Content (Unit: % by Weight)

A press sheet of a polymer material was prepared and its infrared absorption spectrum was measured. The content of ethylene in the material was determined by the calibration curve method using the measured absorbances of the characteristic absorptions of a methyl group ($—CH_3$) and a methylene group ($—CH_2—$).
(4) Ethylene Content of Propylene-Ethylene Random Copolymer Portion in Propylene-Ethylene Block Copolymer (Unit: % by Weight): $[(C2')_{EP}]$ The ethylene content of the propylene-ethylene random copolymer portion in a propylene-ethylene block copolymer was determined from the following equation by using the ethylene content (% by weight) of the block copolymer previously measured by the infrared absorption spectrum method.

$$[(C2')_{EP}]=(C2')T/X$$

$(C2')T$: Ethylene content of the block copolymer (% by weight)
$[(C2')_{EP}]$: Ethylene content of the propylene-ethylene random copolymer (% by weight)
X: Weight ratio of the propylene-ethylene random copolymer portion to the propylene-ethylene block copolymer
(5) Melt Flow Rate (MFR, Unit: g/10 min)

The MFR of a polymer material was measured by the method provided in JIS K7210. The measurement was carried out at a temperature of 230° C. and a load of 2.16 kgf, unless otherwise stated.

(6) Flexural Modulus (FM, Unit: MPa)

The flexural modulus of a molded article was measured by the method provided in JIS K7203. The measurement was conducted at a loading rate of 5 mm/min and a temperature of 23° C. using an injection molded specimen having a thickness of 3.2 mm and a span length of 60 mm.
(7) Izod Impact Strength (Izod, unit: $kJ/cm^2$)

The Izod impact strength of a molded article was measured by the method provided in JIS K7110. The measurement was conducted at a temperature of 23° C. and −30° C. using a notched specimen having a thickness of 6.4 mm which was produced by injection molding and subsequent notching.
(8) Heat Distortion Temperature (HDT, Unit: ° C.)

The heat distortion temperature of a molded article was measured by the method provided in JIS K7207. The measurement was conducted at a fiber stress of 4.6 $kg/cm^2$.
(9) Rockwell Hardness (R Scale)

The Rockwell hardness of a molded article was measured by the method provided in JIS K7202. The measurement was conducted by use of a specimen of 3.0 mm in thickness which was prepared by injection molding. The measured value was expressed in R scale.
(10) Tensile Test (Elongation at Break (UE), Unit: %)

The elongation at break of a molded article was measured by the method provided in ASTM D638. The elongation at break (UE) was measured at a tensile rate of 50 mm/min using an injection molded specimen having a thickness of 3.2 mm.
(11) Isotactic Pentad Fraction The isotactic pentad fraction of a propylene-based polymer was measured by the method using $^{13}C$-NMR disclosed in Macromolecules, 6, 925 (1973). The assignment of NMR absorption peaks was carried out according to the disclosure of Macromolecules, 8, 687 (1975).
(12) Molecular Weight Distribution (Mw/Mn)

The molecular weight distribution was measured by GPC under the conditions given below.
Instrument: Model 150CV (manufactured by Millipore Waters)
Column: Shodex M/S 80
Measurement temperature: 145° C.
Solvent: o-Dichlorobenzene
Sample concentration: 5 mg/8 mL A calibration curve was produced using polystyrene standards. The Mw/Mn of a standard polystyrene (NBS706, Mw/Mn=2.0) measured under such conditions was from 1.9 to 2.0.
[Preparation of Injection Molded Article]

Specimens for the physical property evaluations of (6) to (10) shown above were produced by injection molding at a molding temperature of 220° C., a mold cooling temperature of 50° C., an injection time of 15 seconds, and a cooling time of 30 seconds using an injection molding machine IS150E-V produced by Toshiba Machine Co., Ltd.
(13) Preparation of Injection Molded Article for Evaluation of Flow Mark Appearance Specimens for evaluating the condition of flow mark generation were prepared by the following method.

Figure 1:
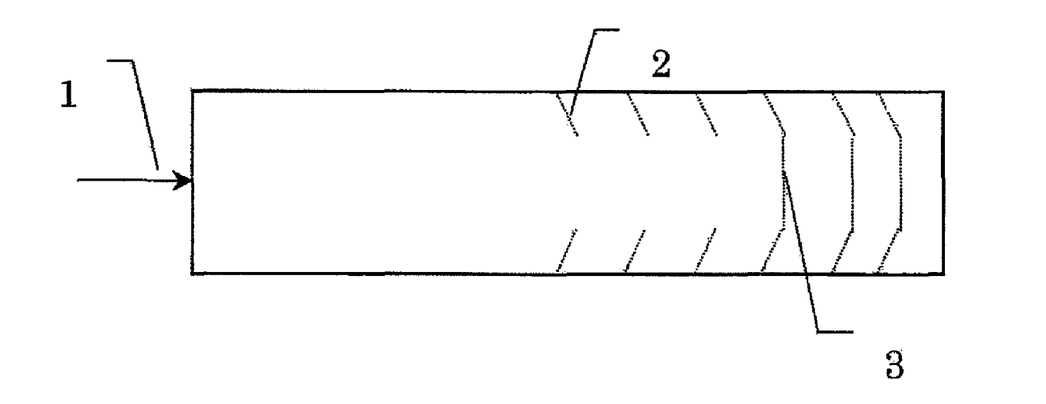
The FIGURE is a schematic plan view of a plate-like molded article to be used for evaluation of flow mark appearance.

Molding was carried out at a molding temperature of 220° C. using an injection machine and a mold [cavity size: 100 mm (width)×200 mm (length)×3.0 mm (thickness), having one gate] mounted to the injection machine. A plate-like molded article was obtained, the schematic diagram of which is illustrated in FIG. 1. In the figure, referential numeral 1 indicates a gate. Referential numeral 2 indicates a flow mark generated on a side face. Referential numeral 3 indicates a flow mark generated in the central portion.

(14) Condition of Flow Mark Generation

Using the plate-like molded article prepared in (13) described above, flow marks were visually observed. At the transverse side end and the transverse central portion of a molded article, the distance between the gate terminal face and the flow mark closest to the gate terminal face (flow mark generation distance, in mm) was measured and the degree of flow mark noticeability was observed. The longer the flow mark generation distance or the less noticeable flow marks, the better the appearance of the molded article is.

The methods for preparing the catalysts (solid catalyst components (I), (II)) used for the production of the polymers in Examples and Comparative Examples are described below.

(1) Solid Catalyst Component (I)

A 200-L SUS reactor equipped with a stirrer was purged with nitrogen. Thereafter, 80 L of hexane, 6.55 mol of titanium tetrabutoxide and 98.9 mol of tetraethoxysilane were charged therein to form a homogeneous solution. Then, 50 L of a 2.1 mol/L solution of butylmagnesium chloride in di-n-butyl ether was added dropwise slowly over 4 hours while maintaining the temperature in the reactor at 20° C. After the dropping was completed, the mixture was further stirred for one hour at 20° C., followed by solid-liquid separation at room temperature. Then, the resulting solid was washed with 70 L of toluene three times. Subsequently, the washed solid was dispersed in toluene to form a slurry, and some toluene was removed so as to adjust the slurry concentration to 0.4 kg/L. A mixed solution of 8.9 mol of di-n-butyl ether and 274 mol of titanium tetrachloride was added and then 20.8 mol of phthalic chloride was further added, followed by a reaction at 110° C. for three hours. After the completion of the reaction, the resulting solid was washed with toluene at 95° C. three times. Subsequently, the washed solid was dispersed in toluene to form a slurry, and the concentration of the slurry was adjusted to 0.4 kg/L. Then, 3.13 mol of diisobutyl phthalate, 8.9 mol of di-n-butyl ether and 109 mol of titanium tetrachloride were added, followed by a reaction at 105° C. for one hour. After the completion of the reaction, solid-liquid separation was carried out at that temperature, and the resulting solid was washed with 90 L of toluene at 95° C. twice. Subsequently, the washed solid was dispersed in toluene to form a slurry, and the concentration of the slurry was adjusted to 0.4 kg/L. Then, 8.9 mol of di-n-butyl ether and 109 mol of titanium tetrachloride were added, followed by a reaction at 95° C. for one hour. After the completion of the reaction, solid-liquid separation was carried out at that temperature, and the resulting solid was washed with 90 L of toluene at the same temperature twice. Subsequently, the washed solid was dispersed in toluene to form a slurry, and the concentration of the slurry was adjusted to 0.4 kg/L. Then, 8.9 mol of di-n-butyl ether and 109 mol of titanium tetrachloride were added, followed by a reaction at 95° C. for one hour. After the reaction was completed, solid-liquid separation was carried out at that temperature. The resulting solid was washed at the same temperature with 90 L of toluene three times and additionally with 90 L of hexane three times, and then was dried under reduced pressure to yield 12.8 kg of a solid catalyst component. The solid catalyst component contained 2.1% by weight of titanium atom, 18% by weight of magnesium atom, 60% by weight of chlorine atom, 7.15% by weight of phthalic acid ester, 0.05% by weight of ethoxy group, and 0.26% by weight of butoxy group. It contained no fine particles and had good particle properties.

This solid catalyst component is hereafter called solid catalyst component (1).

(2) Solid Catalyst Component (II)

Solid catalyst component (II) was produced in the same procedures as those disclosed in JP-A 2004-182876.

[Production of Polymers]

(1) Production of Propylene Homopolymer (HPP)

(1-1) Production of HPP-1

(1-1a) Preliminary Polymerization

In a 3-L SUS autoclave equipped with a stirrer, 25 mmol/L of triethylaluminum (hereinafter, TEA) and tert-butyl-n-propyldimethoxysilane (hereinafter, tBunPrDMS) as an electron donating component in an amount of tBunPrDMS/TEA=0.1 (mol/mol) and 19.5 g/L of the solid catalyst component (II) were added to hexane which had been fully dehydrated and degassed. Subsequently, preliminary polymerization was carried out by feeding propylene continuously until the amount of the propylene fed became 2.5 g per gram of the solid catalyst while keeping a temperature of not higher than 15° C. The resulting preliminary polymer slurry was transferred to a 120-L SUS dilution tank equipped with a stirrer and was diluted by addition of fully refined liquid butane, followed by preservation at a temperature of not higher than 10° C.

(1-1b) Main Polymerization

In a fluidized bed reactor having a capacity of 1 m$^3$ and equipped with a stirrer, propylene and hydrogen were fed so as to keep a polymerization temperature of 83° C., a polymerization pressure of 1.8 MPa-G and a hydrogen concentration in the vapor phase of 17.9 volt based on propylene. Continuous vapor phase polymerization was carried out while continuously feeding 43 mmol/h of TEA, 6.3 mmol/h of cyclohexylethyldimethoxysilane (hereinafter, CHEDMS) and 1.80 g/h of the preliminary polymer slurry prepared in (1-1a) as solid catalyst components. Thus, 18.6 kg/h of a polymer was obtained. The resulting polymer had an intrinsic viscosity $[\eta]_P$ of 0.78 dl/g, an isotactic pentad fraction of 0.985 and a molecular weight distribution of 4.3. The results of the analysis of the resulting polymer are shown in Table 1.

(1-2) Production of HPP-2

Operations were carried out in the same manner as HPP-1, except for adjusting the amount of hydrogen in the vapor phase in main polymerization so that a desired polymer could be obtained. The resulting polymer had an intrinsic viscosity $[\eta]_P$ of 0.92 dl/g, an isotactic pentad fraction of 0.983 and a molecular weight distribution of 5.4.

(1-3) Production of HPP-3

Operations were carried out in the same manner as HPP-1, except for adjusting the amount of hydrogen in the vapor phase in main polymerization so that a desired polymer could be obtained. The resulting polymer had an intrinsic viscosity $[\eta]_P$ of 1.36 dl/g, an isotactic pentad fraction of 0.980 and a molecular weight distribution of 4.2.

(2) Production of Propylene-ethylene Block Copolymer (BCPP)

(2-1) Production of BCPP-1

(2-1a) Preliminary Polymerization

In a 3-L SUS autoclave equipped with a stirrer, 25 mmol/L of TEA and CHEDMS as an electron donating component in an amount of CHEDMS/TEA=0.1 (mol/mol) and 15.8 g/L of the solid catalyst component (I) were added to hexane which had been fully dehydrated and degassed. Subsequently, preliminary polymerization was carried out by feeding propylene continuously until the amount of the propylene fed became 1.0 g per gram of the solid catalyst while keeping a temperature of not higher than 15° C. The resulting preliminary polymer slurry was transferred to a 200-L SUS dilution tank equipped with a stirrer and was diluted by addition of fully refined liquid butane, followed by preservation at a temperature of not higher than 10° C.

(2-1b) Main Polymerization

In an apparatus including one vessel-type reactor having a capacity of 300 L and equipped with a stirrer and two fluidized bed vapor phase reactors each having a capacity of 1 m³ and equipped with a stirrer, the three reactors being arranged in series, a propylene homopolymer portion was produced by continuous polymerization in the first reactor and the polymer generated was transferred to the second reactor without being deactivated. A propylene-ethylene copolymer portion was produced by continuous polymerization in the second reactor and the polymer generated was transferred to the third reactor without being deactivated. In the third reactor, a propylene-ethylene copolymer portion was produced by continuous polymerization.

In the first rector, under conditions including a polymerization temperature of 65° C., a polymerization pressure of 3.06 MPa, a feeding rate of propylene of 45 kg/h and a feeding rate of hydrogen of 239 NL/h, 27.3 mmol of TEA, 5.264 mmol/h of CHEDMS, and 1.28 g/h of the prelimary polymer slurry prepared in (2-1a) as a solid catalyst component were introduced. Thus, a polymer was obtained at a rate of 16.84 kg/h. The intrinsic viscosity $[\eta]_P$ of this polymer was 1.17 dl/g.

In the second reactor, in the presence of a polymer received continuously from the first reactor, continuous polymerization (hereinafter, EP-1 polymerization) was carried out under conditions including a polymerization temperature of 65° C., a polymerization pressure of 1.6 MPa, and continuous introduction of propylene, ethylene and hydrogen such that the concentrations of hydrogen, ethylene and propylene in the vapor phase could be kept at 6.02 vol %, 22.58 vol % and 64.99 vol %, respectively. Thus, a polymer was obtained at a rate of 19.83 kg per hour. A part of the polymer was sampled from the second reactor and then analyzed. It was found that the intrinsic viscosity $[\eta]T$ was 1.30 dl/g and the content of the polymer generated in the second reactor (EP1 content) was 15% by weight. Therefore, the polymer generated in the second reactor (hereinafter, EP-1 portion) had an intrinsic viscosity $[\eta]_{EP-1}$ of 2.0 dl/g. The ethylene content in EP-1 portion was 41% by weight.

Further, in the third reactor, while receiving the polymer from the second reactor, continuous polymerization (hereinafter, EP-2 polymerization) was carried out under conditions including a polymerization temperature of 65° C., a polymerization pressure of 1.2 MPa, and continuous introduction of propylene, ethylene and hydrogen such that the concentrations of hydrogen, ethylene and propylene in the vapor phase could be kept at 0.278 vol %, 25.01 vol % and 73.95 vol %, respectively. Thus, a polymer in an amount of 22.25 kg per hour was obtained. The analysis of a polymer collected showed that the intrinsic viscosity $[\eta]_T$ was 1.87 dl/g and the content of the polymer generated in the third reactor (EP2 content) was 10% by weight. Therefore, the polymer generated in the third reactor (hereinafter, EP-2 portion) had an intrinsic viscosity $[\eta]_{EP-2}$ of 6.8 dl/g. The ethylene content in EP-2 portion was 30% by weight.

(2-2) Production of BCPP-2
(2-2a) Preliminary Polymerization

Polymerization was conducted in the same manner as the preliminary polymerization in the production of BCPP-1.

(2-2b) Main Polymerization

In an apparatus including one vessel-type reactor and two fluidized bed vapor phase reactors as in the production of BCPP-1, a propylene-ethylene block copolymer having a structure P-(EP-1)-(EP-2) was produced by continuous polymerization.

In the first rector, under conditions including a polymerization temperature of 65° C., a polymerization pressure of 3.07 MPa, a feeding rate of propylene of 45 kg/h and a feeding rate of hydrogen of 238 NL/h, 26 mmol of TEA, 6.4 mmol/h of CHEDMS, and 1.27 g/h of the preliminary polymer slurry prepared in (2-2a) as a solid catalyst component were introduced. Thus, a polymer was obtained at a rate of 16.98 kg/h. The intrinsic viscosity $[\eta]_P$ of this polymer was 1.16 dl/g.

In the second reactor, while receiving the polymer from the first reactor, continuous polymerization (hereinafter, EP-1 polymerization) was carried out under conditions including a polymerization temperature of 65° C., a polymerization pressure of 1.6 MPa, and continuous introduction of propylene, ethylene and hydrogen such that the concentrations of hydrogen, ethylene and propylene in the vapor phase could be kept at 3.63 vol %, 21.15 vol % and 66.8 volt, respectively. Thus, a polymer was obtained at a rate of 20.21 kg per hour. A part of the polymer was sampled from the second reactor and then analyzed. It was found that the intrinsic viscosity $[\eta]T$ was 1.36 dl/g and the content of the polymer generated in the second reactor (EP1 content) was 16% by weight. Therefore, the polymer generated in the second reactor (hereinafter, EP-1 portion) had an intrinsic viscosity $[\eta]_{EP-1}$ of 2.5 dl/g. The ethylene content in EP-1 portion was 39% by weight.

Further, in the third reactor, while receiving the polymer from the second reactor, continuous polymerization (hereinafter, EP-2 polymerization) was carried out under conditions including a polymerization temperature of 65° C., a polymerization pressure of 1.2 MPa, and continuous introduction of propylene, ethylene and hydrogen such that the concentrations of hydrogen, ethylene and propylene in the vapor phase could be kept at 15.91 vol %, 31.89 vol % and 50.0 vol %, respectively. Thus, a polymer was obtained at a rate of 22.9 kg per hour. The analysis of a polymer collected showed that the intrinsic viscosity $[\eta]_T$ was 1.43 dl/g and the content of the polymer generated in the third reactor (EP2 content) was 12' by weight. Therefore, the polymer generated in the third reactor (hereinafter, EP-2 portion) had an intrinsic viscosity $[\eta]_{EP-2}$ of 1.9 dl/g. The ethylene content in EP-2 portion was 59% by weight. The results of the analysis of the resulting polymer are shown in Table 1.

(2-3) Production of BCPP-3
(2-3a) Preliminary Polymerization

Using an autoclave equipped with a stirrer, 20 mmol/L of TEA, tBunPrDMS as an electron donating component in an amount of tBunPrDMS/TEA=0.1 (mol/mol), and solid catalyst component (II) in an amount of Ti contained in the catalyst component to be TEA/Ti=3.8 were introduced in this order into hexane which had been fully dehydrated and degassed. A preliminary polymer slurry was obtained by continuously introducing propylene while maintaining the temperature within the range of from 5 to 15° C. so that the ratio of the polymer based on the solid catalyst component (hereinafter, abbreviated as PP/cat) would become 1.0 (g/g). The resulting preliminary polymer slurry was transferred to an autoclave equipped with a stirrer, and it was preserved at a temperature not higher than 10° C. after addition of fully refined liquid butane.

(2-3b) Main Polymerization

Continuous polymerization was performed using an apparatus including five polymerization reactors arranged in series. Bulk polymerization of propylene was conducted in the upstream first, second and third reactors. At the time when a slurry with a predetermined powder concentration had been formed in the third reactor, a slurry discharged from the third reactor was transferred to the fourth vapor phase polymerization reactor containing a vapor phase having been adjusted to a predetermined propylene-to-ethylene ratio and a propylene-ethylene random copolymer (EP-1) was produced. Moreover, a polymer powder discharged from the fourth reactor when a desired polymer had been formed in the fourth reactor was transferred to the fifth vapor phase polymerization reactor containing a vapor phase having been adjusted to a predetermined propylene-to-ethylene ratio and then a propylene-ethylene copolymer (EP-2) was produced. Thus, a propylene-ethylene block copolymer having a structure P-(EP-1)-(EP-2) was obtained.

In the first, second and third reactors, the temperature in each reactor was adjusted to 70° C., 70° C., and 67° C., respectively, and the polymerization pressure was adjusted to 4.55 MPa, 3.99 MPa, and 3.75 MPa, respectively. Into the first reactor, 25 kg/h of propylene, 300 NL/h of hydrogen, 42.2 mmol of TEA, 6.13 mmol/h of tBunPrDMS, and 1.03 g/h of the preliminary polymer slurry prepared in (2-3a) as a solid catalyst component were introduced, and into the second reactor, 15 kg/h of propylene and 70 NL/h of hydrogen were introduced. Continuous polymerization was conducted under conditions where the residence times in the first, second and third reactors were adjusted to 0.3 hours, 0.5 hours and 0.5 hours, respectively. Thus, a polymer was obtained at a rate of 13.1 kg/h. The intrinsic viscosity $[\eta]_P$ of this polymer was 0.90 dl/g.

In the fourth reactor, while receiving the polymer from the third reactor, continuous polymerization (hereinafter, EP-1 polymerization) was carried out under conditions including a polymerization temperature of 70° C., a polymerization pressure of 1.6 MPa, and continuous introduction of propylene, ethylene and hydrogen such that the concentrations of hydrogen, ethylene and propylene in the vapor phase could be kept at 6.8 vol %, 46.4 vol % and 46.8 vol %, respectively. Thus, a polymer was obtained at a rate of 17.1 kg per hour. A part of the polymer was sampled from the fourth reactor and then analyzed. It was found that the intrinsic viscosity $[\eta]_T$ was 1.32 dl/g and the content of the polymer generated in the fourth reactor (EP1 content) was 23% by weight. Therefore, the polymer generated in the fourth reactor (hereinafter, EP-1 portion) had an intrinsic viscosity $[\eta]_{EP-1}$ of 2.7 dl/g. The ethylene content in EP-1 portion was 59% by weight.

Further, in the fifth reactor, while receiving the polymer from the fourth reactor, continuous polymerization (hereinafter, EP-2 polymerization) was carried out under conditions including a polymerization temperature of 70° C., a polymerization pressure of 1.2 MPa, and continuous introduction of propylene, ethylene and hydrogen such that the concentrations of hydrogen, ethylene and propylene in the vapor phase could be kept at 0.4 volt, 28.2 vol % and 71.4 vol %, respectively. Thus, a polymer was obtained at a rate of 18.9 kg per hour. The analysis of a polymer collected showed that the intrinsic viscosity $[\eta]_T$ was 1.74 dl/g and the content of the polymer generated in the fifth reactor (hereinafter, EP2 content) was 10% by weight. Therefore, the polymer generated in the fifth reactor (hereinafter, EP-2 portion) had an intrinsic viscosity $[\eta]_{EP-2}$ of 5.6 dl/g. The ethylene content in EP-2 portion was 33% by weight. The results of the analysis of the resulting polymer are shown in Table 1.

(2-4) Production of BCPP-4
(2-4a) Preliminary Polymerization

Preliminary polymerization was conducted in the same manner as the production of BCPP-3.

(2-4b) Main Polymerization

In an apparatus including five reactors arranged in series same as in the production of BCPP-3, a propylene-ethylene block copolymer having a structure P-(EP-1)-(EP-2) was produced by continuous polymerization.

In the first, second and third reactors, the temperature in each reactor was adjusted to 70° C., 70° C., and 67° C., respectively, and the polymerization pressure was adjusted to 4.50 MPa, 3.97 MPa, and 3.75 MPa, respectively. Into the first reactor, 25 kg/h of propylene, 300 NL/h of hydrogen, 42.4 mmol of TEA, 6.22 mmol/h of tBunPrDMS, and 1.08 g/h of the preliminary polymer slurry prepared in (2-4a) as a solid catalyst component were introduced, and into the second reactor, 15 kg/h of propylene and 70 NL/h of hydrogen were introduced. Continuous polymerization was conducted under conditions where the residence times in the first, second and third reactors were adjusted to 0.3 hours, 0.5 hours and 0.5 hours, respectively. A polymer was obtained at a rate of 14.2 kg/h and the intrinsic viscosity $[\eta]_P$ of this polymer was 0.90 dl/g.

In the fourth reactor, while receiving the polymer from the third reactor, continuous polymerization (hereinafter, EP-1 polymerization) was carried out under conditions including a polymerization temperature of 70° C., a polymerization pressure of 1.6 MPa, and continuous introduction of propylene, ethylene and hydrogen such that the concentrations of hydrogen, ethylene and propylene in the vapor phase could be kept at 6.5 vol %, 39.4 vol % and 54.1 volt, respectively. Thus, a polymer was obtained at a rate of 19.0 kg per hour. A part of the polymer was sampled from the fourth reactor and then analyzed. It was found that the intrinsic viscosity $[\eta]_T$ was 1.32 dl/g and the content of the polymer generated in the fourth reactor (EP1 content) was 25a by weight. Therefore, the polymer generated in the fourth reactor (hereinafter, EP-1 portion) had an intrinsic viscosity $[\eta]_{EP-1}$ of 2.6 dl/g. The ethylene content in EP-1 portion was 52% by weight.

Further, in the fifth reactor, while receiving the polymer from the fourth reactor, continuous polymerization (hereinafter, EP-2 polymerization) was carried out under conditions including a polymerization temperature of 70° C., a polymerization pressure of 1.2 MPa, and continuous introduction of propylene, ethylene and hydrogen such that the concentrations of hydrogen, ethylene and propylene in the vapor phase could be kept at 1.6 vol %, 27.6 vol % and 70.8 vol %, respectively. Thus, a polymer was obtained at a rate of 21.2 kg per hour. The analysis of a polymer collected showed that the intrinsic viscosity $[\eta]_T$ was 1.54 dl/g and the content of the polymer generated in the fifth reactor (hereinafter, EP2 content) was 10% by weight. Therefore, the polymer generated in the fifth reactor (hereinafter, EP-2 portion) had an intrinsic viscosity $[\eta]_{EP-2}$ of 3.4 dl/g. The ethylene content in EP-2 portion was 34% by weight. The results of the analysis of the resulting polymer are shown in Table 1.

(2-5) Production of BCPP-5
(2-5a) Preliminary Polymerization

Using an autoclave equipped with a stirrer, 25 mmol/L of TEA, tBunPrDMS in an amount of tBunPrDMS/TEA=0.1 (mol/mol), and solid catalyst component (II) in an amount of Ti contained in the catalyst component to be TEA/Ti=3 were introduced in this order into hexane which had been fully dehydrated and degassed. A preliminary polymer slurry was obtained by continuously introducing propylene while maintaining the temperature within the range of from 5 to 15° C. so that the ratio of the polymer based on the solid catalyst component (hereinafter, abbreviated as PP/cat) would become 1.0 (g/g). The resulting preliminary polymer slurry was transferred to an autoclave equipped with a stirrer, and it was preserved at a temperature not higher than 10° C. after addition of fully refined liquid butane.

(2-5b) Main Polymerization

In an apparatus including five reactors arranged in series as in the production of BCPP-3, a propylene-ethylene block copolymer having a structure P-(EP-1)-(EP-2) was produced by continuous polymerization.

In the first, second and third reactors, the temperature in each reactor was adjusted to 70° C., 70° C., and 65° C., respectively, and the polymerization pressure was adjusted to 4.51 MPa, 3.97 MPa, and 3.56 MPa, respectively. Into the first reactor, 30 kg/h of propylene, 320 NL/h of hydrogen, 68.2 mmol of TEA, 10.3 mmol/h of tBunPrDMS, and 0.843 g/h of the preliminary polymer slurry prepared in (2-5a) as a solid catalyst component were introduced, and into the second reactor, 15 kg/h of propylene and 120 NL/h of hydrogen were introduced. Continuous polymerization was conducted under conditions where the residence times in the first, second and third reactors were adjusted to 0.2 hours, 0.4 hours and 0.5 hours, respectively. A polymer was obtained at a rate of 14.2 kg/h and the intrinsic viscosity $[\eta]_P$ of this polymer was 0.91 dl/g.

In the fourth reactor, while receiving the polymer from the third reactor, continuous polymerization (hereinafter, EP-1 polymerization) was carried out under conditions including a polymerization temperature of 70° C., a polymerization pressure of 1.6 MPa, and continuous introduction of propylene, ethylene and hydrogen such that the concentrations of hydrogen, ethylene and propylene in the vapor phase could be kept at 4.5 volt, 41.7 vol % and 53.8 vol %, respectively. Thus, a polymer was obtained at a rate of 21.8 kg per hour. A part of the polymer was sampled from the fourth reactor and then analyzed. It was found that the intrinsic viscosity $[\eta]_T$ was 1.48 dl/g and the content of the polymer generated in the fourth reactor (EP1 content) was 34.7% by weight. Therefore, the polymer generated in the fourth reactor (hereinafter, EP-1 portion) had an intrinsic viscosity $[\eta]_{EP-1}$ of 2.6 dl/g. The ethylene content in EP-1 portion was 56% by weight.

Further, in the fifth reactor, while receiving the polymer from the fourth reactor, continuous polymerization (hereinafter, EP-2 polymerization) was carried out under conditions including a polymerization temperature of 70° C., a polymerization pressure of 1.2 MPa, and continuous introduction of propylene, ethylene and hydrogen such that the concentrations of hydrogen, ethylene and propylene in the vapor phase could be kept at 0.25 vol %, 22.6 vol % and 77.15 volt, respectively. Finally, a polymer was obtained at a rate of 23.1 kg per hour. The analysis of a polymer collected showed that the intrinsic viscosity $[\eta]_T$ was 1.83 dl/g and the content of the polymer generated in the fifth reactor (hereinafter, EP2 content) was 6% by weight. Therefore, the polymer generated in the fifth reactor (hereinafter, EP-2 portion) had an intrinsic viscosity $[\eta]_{EP-2}$ of 7.9 dl/g. The ethylene content in EP-2 portion was 41% by weight. The results of the analysis of the resulting polymer are shown in Table 1.

(2-6) Production of BCPP-6

(2-6a) Preliminary Polymerization

Polymerization was conducted in the same manner as the production of BCPP-5.

(2-6b) Main Polymerization

In an apparatus including five reactors arranged in series same as in the production of BCPP-3, a propylene-ethylene block copolymer having a structure P— (EP-1)-(EP-2) was produced by continuous polymerization.

In the first, second and third reactors, the temperature in each reactor was adjusted to 75° C., 70° C., and 65° C., respectively, and the polymerization pressure was adjusted to 4.41 MPa, 3.88 MPa, and 3.67 MPa, respectively. Into the first reactor, 30 kg/h of propylene, 320 NL/h of hydrogen, 66.1 mmol of TEA, 10.2 mmol/h of tBunPrDMS, and 0.870 g/h of the preliminary polymer slurry prepared in (2-5a) as a solid catalyst component were introduced, and into the second reactor, 15 kg/h of propylene and 120 NL/h of hydrogen were introduced. Continuous polymerization was conducted under conditions where the residence times in the first, second and third reactors were adjusted to 0.2 hours, 0.4 hours and 0.5 hours, respectively. A polymer was obtained at a rate of 16.7 kg/h and the intrinsic viscosity $[\eta]_P$ of this polymer was 0.91 dl/g.

In the fourth reactor, while receiving the polymer from the third reactor, continuous polymerization (hereinafter, EP-1 polymerization) was carried out under conditions including a polymerization temperature of 70° C., a polymerization pressure of 1.6 MPa, and continuous introduction of propylene, ethylene and hydrogen such that the concentrations of hydrogen, ethylene and propylene in the vapor phase could be kept at 4.4 vol %, 42.5 vol % and 53.1 vol %, respectively. Thus, a polymer was obtained at a rate of 25.0 kg per hour. A part of the polymer was sampled from the fourth reactor and then analyzed. It was found that the intrinsic viscosity $[\eta]_T$ was 1.51 dl/g and the content of the polymer generated in the fourth reactor (EP1 content) was 33% by weight. Therefore, the polymer generated in the fourth reactor (hereinafter, EP-1 portion) had an intrinsic viscosity $[\eta]_{EP-1}$ of 2.7 dl/g. The ethylene content in EP-1 portion was 57% by weight.

Further, in the fifth reactor, while receiving the polymer from the fourth reactor, continuous polymerization (hereinafter, EP-2 polymerization) was carried out under conditions including a polymerization temperature of 70° C., a polymerization pressure of 1.2 MPa, and continuous introduction of propylene, ethylene and hydrogen such that the concentrations of hydrogen, ethylene and propylene in the vapor phase could be kept at 2.4 vol %, 29.0 vol % and 68.6 vol %, respectively. Thus, a polymer was obtained at a rate of 26.2 kg per hour. The analysis of a polymer collected showed that the intrinsic viscosity $[\eta]_T$ was 1.56 dl/g and the content of the polymer generated in the fifth reactor (hereinafter, EP2 content) was 5% by weight. Therefore, the polymer generated in the fifth reactor (hereinafter, EP-2 portion) had an intrinsic viscosity $[\eta]_{EP-2}$ of 2.6 dl/g. The ethylene content in EP-2 portion was 50% by weight. The results of the analysis of the resulting polymer are shown in Table 1.

Example 1

To 100 parts of a powder of a propylene-ethylene block copolymer (BCPP-1), 0.05 parts by weight of calcium stearate (produced by NOF Corp.), 0.05 parts by weight of 3,9-bis [2-{3-(3-tert-butyl-4-hydroxy-5-methylphenyl) propionyloxy}-1,1-dimethylethyl]-2,4,8,10-tetraoxaspiro [5.5] undecane (Sumilizer GA80, produced by Sumitomo Chemical Co., Ltd.), and 0.05 parts by weight of bis(2,4-di-tert-butylphenyl)pentaerythritol diphosphite (Ultranox U626, produced by GE Specialty Chemicals) were added as stabilizers and then dry blended. The resulting blend was pelletized by means of a 40-mmφ single screw extruder (at 220° C.) to yield pellets of BCPP-1.

68% by weight of pellets of BCPP-1, 5% by weight of a powder of propylene homopolymer (HPP-1), 11% by weight of ethylene-butene-1 random copolymer rubber EBR-1 (TAFMER A6050 produced by Mitsui Chemicals, Inc., density=0.864 g/cm$^3$, MFR(190° C.)=6.5 g/10 min) as an ethylene-α-olefin copolymer rubber (B) and 16% by weight of talc having an average particle diameter of 2.7 μm (commercial name: MWHST, produced by Hayashi Kasei Co., Ltd.) as an inorganic filler (C) were preliminarily mixed uniformly in a tumbler. Then, the mixture was kneaded and extruded using a twin screw kneading extruder (TEX44SS-30BW-2V produced by The Japan Steel Works, Ltd.) at an extrusion rate of 50 kg/hr, 230° C. and a screw speed of 350 rpm.

In Table 2, the compounding ratios of the components, the MFR of the resulting polypropylene resin composition, and the physical properties of molded articles produced from the composition are shown.

Example 2

By conducting operations in the same manner as Example 1 except for changing propylene-ethylene block copolymer (BCPP-1) to propylene-ethylene block copolymer (BCPP-3), pellets of BCPP-3 were prepared. 70% by weight of pellets of BCPP-3, 5% by weight of a powder of propylene homopolymer (HPP-2), 9% by weight of ethylene-butene-1 random copolymer rubber EBR-2 (ENGAGE 7467 produced by The Dow Chemical Co., Ltd., density=0.862 g/cm$^3$, MFR(190° C.)=1.2 g/10 min) as an ethylene-α-olefin copolymer rubber (B) and 16% by weight of talc having an average particle diameter of 2.7 μm (commercial name: MWHST, produced by Hayashi Kasei Co., Ltd.) as an inorganic filler (C) were compounded. Then, the mixture was subjected to the same treatment as Example 1 to yield a polypropylene resin composition.

In Table 2, the compounding ratios of the components, the MFR of the resulting polypropylene resin composition, and the physical properties of molded articles produced from the composition are shown.

Example 3

By conducting operations in the same manner as Example 1 except for changing propylene-ethylene block copolymer (BCPP-1) to propylene-ethylene block copolymer (BCPP-5), pellets of BCPP-5 were prepared. 29% by weight of pellets of BCPP-5, 15% by weight of a powder of propylene homopolymer (HPP-1), 26% by weight of a powder of propylene homopolymer (HPP-3), 10% by weight of ethylene-octene-1 random copolymer rubber EOR-2 (ENGAGE 8150 produced by The Dow Chemical Co., Ltd. density=0.868 g/cm$^3$, MFR (190° C.)=0.5 g/10 min) as an ethylene-α-olefin copolymer rubber (B) and 20% by weight of talc having an average particle diameter of 2.7 μm (commercial name: MWHST, produced by Hayashi Kasei Co., Ltd.) as an inorganic filler (C) were compounded. Then, the mixture was subjected to the same treatment as Example 1 to yield a polypropylene resin composition.

In Table 2, the compounding ratios of the components, the MFR of the resulting polypropylene resin composition, and the physical properties of molded articles produced from the composition are shown.

Comparative Example 1

A polypropylene resin composition was produced in the same manner as Example 1 except for changing propylene-ethylene block copolymer (BCPP-1) to propylene-ethylene block copolymer (BCPP-2). In Table 2, the compounding ratios of the components, the MFR of the resulting polypropylene resin composition, and the physical properties of molded articles produced from the composition are shown.

Comparative Example 2

A polypropylene resin composition was produced in the same manner as Example 2 except for changing propylene-ethylene block copolymer (BCPP-3) to propylene-ethylene block copolymer (BCPP-4). In Table 2, the compounding ratios of the components, the MFR of the resulting polypropylene resin composition, and the physical properties of molded articles produced from the composition are shown.

Comparative Example 3

By conducting operations in the same manner as Example 1 except for changing propylene-ethylene block copolymer (BCPP-1) to propylene-ethylene block copolymer (BCPP-6), pellets of BCPP-6 were prepared. 31% by weight of pellets of BCPP-6, 15% by weight of a powder of propylene homopolymer (HPP-1), 24% by weight of a powder of propylene homopolymer (HPP-3), 10% by weight of ethylene-octene-1 random copolymer rubber EOR-2 (ENGAGE 8150 produced by The Dow Chemical Co., Ltd., density=0.868 g/cm$^3$, MFR (190° C.)=0.5 g/10 min) as an ethylene-α-olefin copolymer rubber (B) and 20% by weight of talc having an average particle diameter of 2.7 μm (commercial name: MWHST, produced by Hayashi Kasei Co., Ltd.) as an inorganic filler (C) were compounded. Then, the mixture was subjected to the same treatment as Example 1 to yield a polypropylene resin composition. In Table 2, the compounding ratios of the components, the MFR of the resulting polypropylene resin composition, and the physical properties of molded articles produced from the composition are shown.

TABLE 1

|  |  | Propylene-ethylene block copolymer | | | | | |
| --- | --- | --- | --- | --- | --- | --- | --- |
|  |  | BCPP-1 | BCPP-2 | BCPP-3 | BCPP-4 | BCPP-5 | BCPP-6 |
| [η] P | dl/g | 1.17 | 1.16 | 0.90 | 0.90 | 0.91 | 0.91 |
| [η] EP | dl/g | 4.7 | 2.2 | 3.6 | 2.9 | 3.4 | 2.7 |
| (C' 2) E | % by weight | 35 | 48 | 51 | 46 | 54 | 56 |
| EP content | % by weight | 25 | 28 | 31 | 33 | 38 | 36 |
| [η] EP-1 | dl/g | 2.0 | 2.5 | 2.7 | 2.6 | 2.6 | 2.7 |
| (C' 2) EP-1 | % by weight | 41 | 39 | 59 | 52 | 56 | 57 |
| (C' 2) EP-2 | dl/g | 6.8 | 1.9 | 5.6 | 3.4 | 7.9 | 2.6 |
| (C' 2) EP-2 | % by weight | 30 | 59 | 33 | 34 | 41 | 50 |

TABLE 2

|  |  | Example | | | Comparative Example | | |
| --- | --- | --- | --- | --- | --- | --- | --- |
|  |  | 1 | 2 | 3 | 1 | 2 | 3 |
| BCPP-1 | % by weight | 68 |  |  |  |  |  |
| BCPP-2 | % by weight |  |  |  | 68 |  |  |
| BCPP-3 | % by weight |  | 70 |  |  |  |  |
| BCPP-4 | % by weight |  |  |  |  | 70 |  |
| BCPP-5 | % by weight |  |  | 29 |  |  |  |

TABLE 2-continued

|  |  | Example | | | Comparative Example | | |
| --- | --- | --- | --- | --- | --- | --- | --- |
|  |  | 1 | 2 | 3 | 1 | 2 | 3 |
| BCPP-6 | % by weight |  |  |  |  |  | 31 |
| HPP-1 | % by weight | 5 |  | 15 | 5 |  | 15 |
| HPP-2 | % by weight |  | 5 |  |  | 5 |  |
| HPP-3 | % by weight |  |  | 26 |  |  | 24 |
| EBR-1 | % by weight | 11 |  |  | 11 |  |  |
| EBR-2 | % by weight |  | 9 |  |  | 9 |  |
| EOR-1 | % by weight |  |  | 10 |  |  | 10 |
| Talc | % by weight | 16 | 16 | 20 | 16 | 16 | 20 |
| MFR | g/10 min | 12 | 24 | 18 | 19 | 28 | 22 |
| Flexural modulus | MPa | 1800 | 1560 | 2290 | 1700 | 1490 | 2280 |
| IZOD 23° C. | kJ/m$^2$ | 40 | 28 | 13 | 42 | 39 | 10 |
| IZOD -30° C. | kJ/m$^2$ | 4.5 | 5.8 | 3.2 | 4.6 | 5.9 | 3.2 |
| Rockwell hardness | R scale | 56 | 48 | 77 | 45 | 44 | 77 |
| Heat distortion temperature | ° C. | 129 | 127 | 74*[1] | 130 | 123 | 74*[1] |
| Tensile elongation | % | >500 | 72 | 191*[2] | 155 | 66 | 141*[2] |
| Flow mark generation distance A | mm | 250 | 240 | 175 | 110 | 115 | 145 |
| Flow mark generation distance B | mm | 295 | No flow mark | 320 | 140 | No flow mark | 275 |
| Flow mark noticeability |  | ○ | ○ | ○ | X | X | X |

*[1])The measurement was conducted at a fiber stress of 18.6 kg/cm$^2$.
*[2])The measurement was conducted at a tensile speed of 10 mm/min.
*3) Degree of noticeability of flow marks by visual observation
○: Flow marks were not noticeable.
Δ: Flow marks were slightly noticeable.
X: Flow marks were noticeable.

INDUSTRIAL APPLICABILITY

The polypropylene resin composition of the present invention can be used in the fields where high quality is required, such as automotive interior or exterior components.

What is claimed is:

1. A polypropylene resin composition comprising from 50 to 94% by weight of a polypropylene resin (A), from 1 to 25% by weight of an ethylene-α-olefin copolymer rubber (B) comprising an ethylene-α-olefin copolymer rubber (B-1) comprising a C4 to C12 α-olefin and ethylene and having a density of from 0.85 to 0.91 g/cm$^3$ and a melt flow rate of from 0.9 to 20 g/10 min as measured at a temperature of 190° C. and a load of 2.16 kgf and/or an ethylene-α-olefin copolymer rubber (B-2) comprising a C5 to C12 α-olefin and ethylene and having a density of from 0.85 to 0.91 g/cm$^3$ and a melt flow rate of not less than 0.01 but less than 0.9 g/10 min as measured at a temperature of 190° C. and a load of 2.16 kgf, and from 5 to 25% by weight of an inorganic filler (C), where the amounts of (A), (B) and (C) are each based on the total weight of the polypropylene-based resin composition,
   wherein the polypropylene resin (A) is a crystalline propylene-ethylene block copolymer (A-1) satisfying the following requirements (1), (2), (3) and (4), or a polymer mixture (A-3) comprising the block copolymer (A-1) and a crystalline propylene homopolymer (A-2),
   requirement (1): the block copolymer (A-1) is a crystalline propylene-ethylene block copolymer comprising from 55 to 85% by weight, based on the total weight of the block copolymer (A-1), of a crystalline polypropylene portion and from 15 to 45% by weight, based on the total weight of the block copolymer (A-1), of a propylene-ethylene random copolymer portion,
   requirement (2): the crystalline polypropylene portion in the block copolymer (A-1) is a propylene homopolymer or a copolymer of propylene with 1 mol% or less, based on the total amount of all monomers in the copolymer, of ethylene or α-olefin having 4 or more carbon atoms,
   requirement (3): the weight ratio of propylene to ethylene contained in the propylene-ethylene random copolymer portion of the block copolymer (A-1) is from 75/25 to 40/60,
   requirement (4): the propylene-ethylene random copolymer portion of the block copolymer (A-1) comprises a propylene-ethylene random copolymer component (EP-A) and a propylene-ethylene random copolymer component (EP-B), the copolymer component (EP-A) having an intrinsic viscosity $[\eta]_{EP-A}$ of more than 6 dl/g but not more than 9 dl/g and an ethylene content $[(C2')_{EP-A}]$ of not less than 20% by weight but less than 50% by weight, and the copolymer component (EP-B) having an intrinsic viscosity $[\eta]_{EP-B}$ of not less than 0.5 dl/g but less than 3.5 dl/g and an ethylene content $[(C2')_{EP-B}]$ of from 30% by weight to 60% by weight.

2. The polypropylene resin composition according to claim 1, wherein the ethylene content $[(C2')_{EP-B}]$ is not less than the ethylene content $[(C2')_{EP-A}]$.

3. The polypropylene resin composition according to claim 1, wherein the intrinsic viscosity $[\eta]_{EP-A}$ is more than 6 dl/g but not more than 8 dl/g, and the intrinsic viscosity $[\eta]_{EP-B}$ is from 1.5 dl/g to 3.5 dl/g.

4. The polypropylene resin composition according to claim 1, wherein the crystalline polypropylene portion of the block copolymer (A-1) has an intrinsic viscosity $[\eta]_P$ of from 0.6 dl/g to 1.5 dl/g and a molecular weight distribution of not less than 3 but less than 7 as measured by GPC.

5. The polypropylene resin composition according to claim 1, wherein the crystalline polypropylene portion of the block copolymer (A-1) has an isotactic pentad fraction of 0.97 or more.

6. The polypropylene resin composition according to claim 1, wherein the inorganic filler (C) is talc.

7. An injection molded article comprising the polypropylene resin composition according to claim 1.

* * * * *